June 1, 1965  J. H. WALLY, JR  3,186,297
CAMERA-PROJECTOR HAVING FILM GATE MOUNTED ON CONDENSER LENS
Filed Nov. 30, 1961  4 Sheets-Sheet 1

INVENTOR.
Joseph H. Wally, Jr.,
BY Brown, Jackson,
Boettcher & Drenner

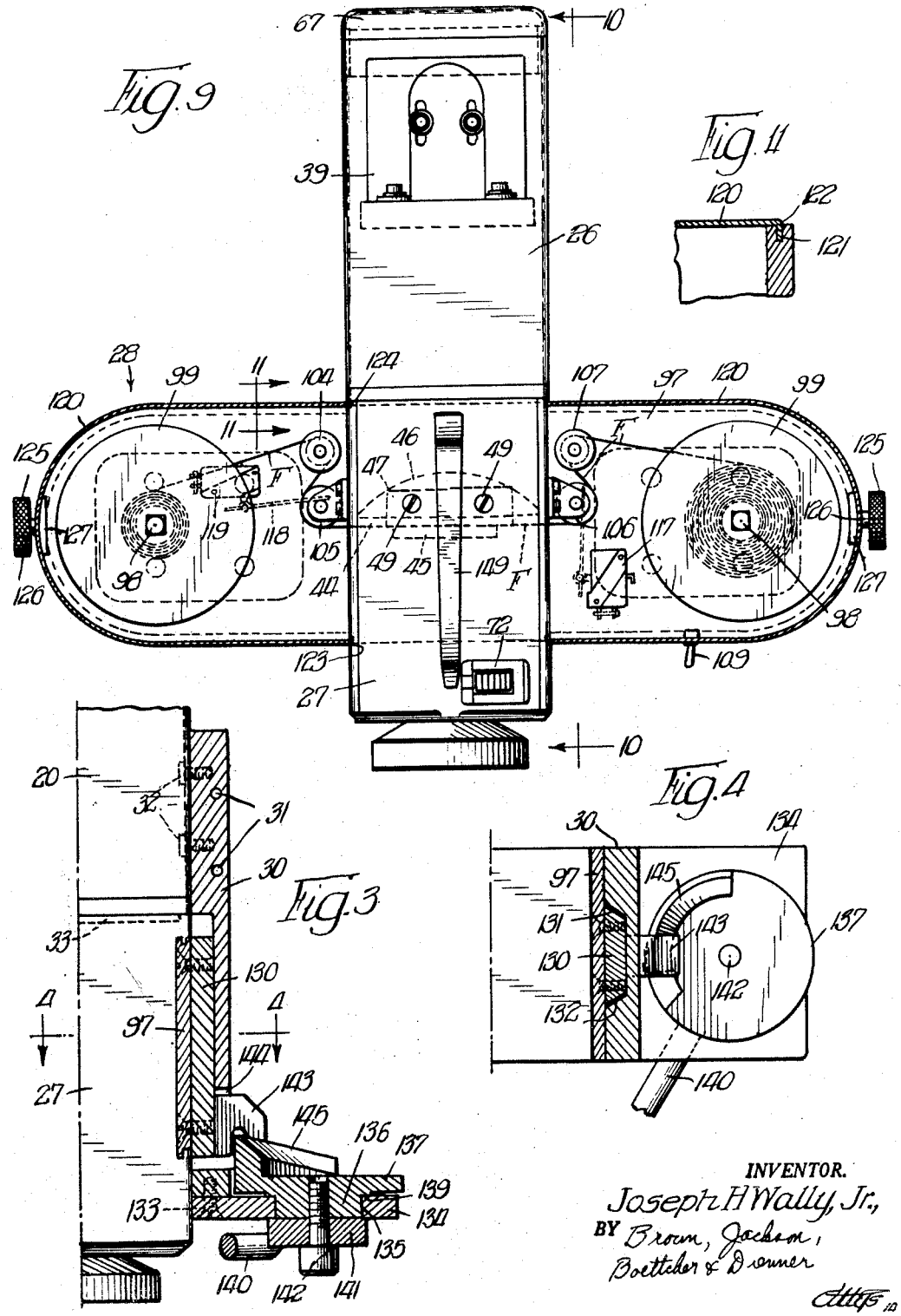

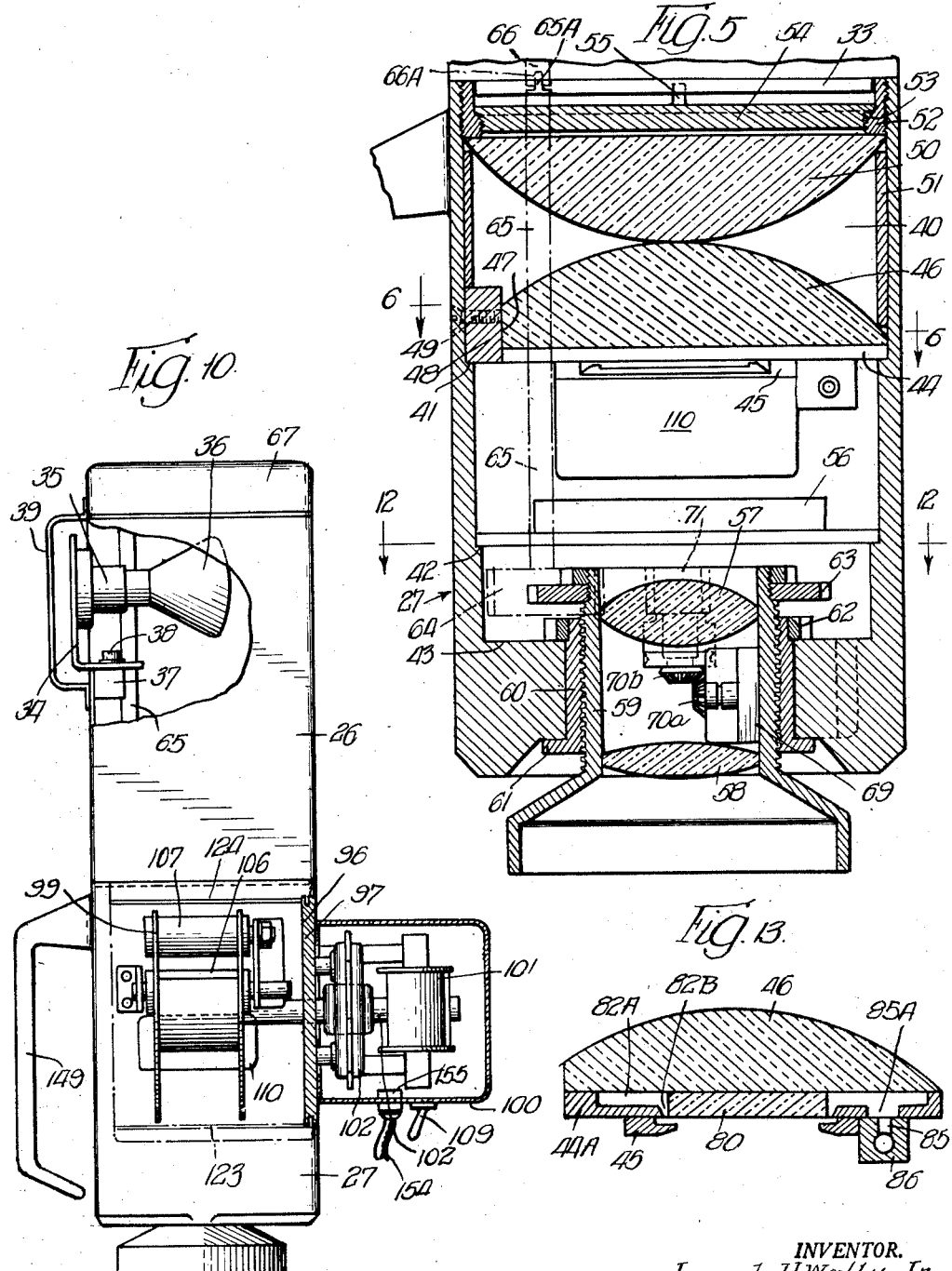

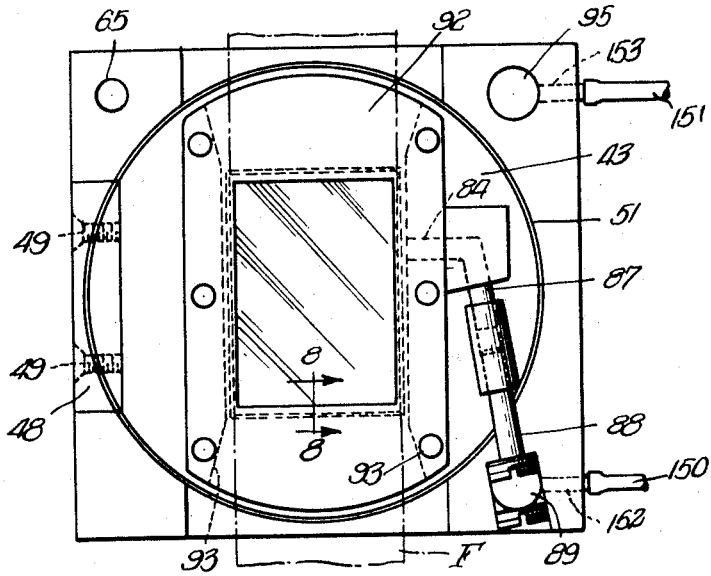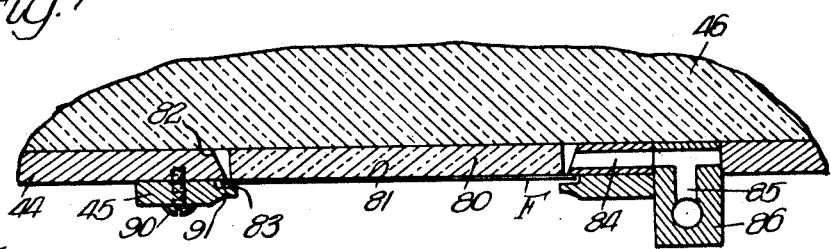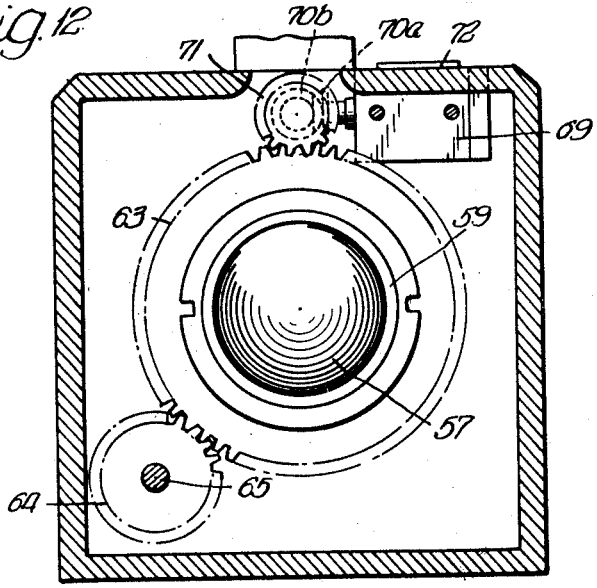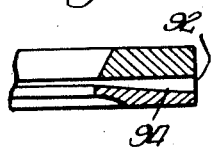

United States Patent Office 3,186,297
Patented June 1, 1965

3,186,297
CAMERA-PROJECTOR HAVING FILM GATE MOUNTED ON CONDENSER LENS
Joseph H. Waily, Jr., Shawnee Mission, Kans., assignor to Western Blue Print Company, Kansas City, Mo., a corporation of Missouri
Filed Nov. 30, 1961, Ser. No. 156,065
11 Claims. (Cl. 88—24)

This invention relates generally to optical devices and more particularly to those having their principal use in microphotography either as a camera to produce an image in light sensitive film or to project an image of a thus previously produced image in film onto an easel.

A first and principal object of the present invention is to provide a device which may be interchangeably used either as a camera or as a projector.

A further and important object of the invention is to provide a camera-projector having an optical head in which the optical components and film storage means may be readily separated from the lamp housing as a unit and for example carried to a dark room for unloading or loading fresh film.

A more specific object of the invention is to provide such an optical head in which the lamp housing and separable optical chamber are so designed that they will fit together in exact alignment and yet can be conveniently and quickly separated or assembled.

Another object of the invention is to provide simple yet convenient means by which the optical chamber and its associated film storage means may be rendered light-tight and the light source of the lamp housing occluded so that the apparatus is useful as a camera.

Another object of the invention is to provide a novel arrangement of the components of the optical chamber which will permit improved resolution and accuracy in image reproduction.

To this end, a feature of the present invention is the novel means of focusing and for checking the spacing of the objective lenses relative to the film gate to assure that they are in proper focus with respect to the easel and film gate at different heights to which the optical head is adjusted to accommodate different magnification or reduction factors.

Another feature of the invention is the novel film holder employed which permits vacuum support of the film to precisely locate it with respect to the optical components of the device and to assure that each time the device is used, whether as a camera or as a projector, the film will be located in exactly the same location in the optical chamber. This permits axial adjustments of the objective lens to be accurately predicted for obtaining maximum resolution of the image both on the sensitized film as well as permitting the image of the developed film to be projected back to full size with great fidelity.

A further feature of the invention is that the platen against which the film is precisely drawn may be flat, that is, planar or may be formed to any desired curvature. Furthermore, in each instance the film will be precisely located and conformed exactly to the shape of the platen.

Furthermore, the platen is transparent and the vacuum induced drawback of the film is arranged to be outside the image area so that the film holder is equally useful in projection as in reproduction on sensitized film, since there is no impediment of the light rays through the image forming portion of the film during projection.

A further feature of the invention is that the film gate is made an integral part of the planar side of the first condenser lens and locating means are provided for assuring proper alignment of the film gate relative to the film storage compartments.

Thus, in the accomplishment of the above, the present invention provides a platen of transparent glass fused or cemented to the planar side of the condenser lens, which it surrounds with one of two superposed frame members constituting the film gate. The first frame member is so shaped as to leave a continuous channel about the edge of the transparent platen and which is appropriately ported for connection to air evacuating pump. The second frame combines with the first member to provide a lip over the channel and to frame the image portion of the film when in strand form as well as confining it so that it is accurately tracked.

The condenser lens to which the film gate is attached is provided with a flattened edge paralleling its axis and locating means are provided adjacent its seat in the optical chamber so that the condenser lens can seat in only one position and so will both accurately locate the film gate relative to the entering film as well as prevent it from turning out of said position.

A further feature of the invention is that an optical chamber is constituted in one piece, and is so apertured and chambered that its functional elements can seat in exact juxtaposition and relation to each other and will be so retained. In 35 millimeter and smaller film sizes, immobility and preciseness in arrangement and spacing of the lens elements and other components such as film gate and shutter are critical if focus and resolution are to be held.

Other features, objects and advantages of the invention include the supporting of the film reels on either side of the optical compartment or chamber and their arrangement to be motor driven through appropriate clutches so that as one reel is being driven, the other reel is freely rotatable in response thereto. Because one motor drives its reel in one direction and the other motor drives its reel in the opposite direction, by means of a simple push button action, the film strand can be sent forward or backward for projection.

Another feature of the invention is the arrangement by which the film reels may be made light tight to permit their loading with light sensitive film as when the optical chamber is being used as a camera.

Many other objects, features and advantages of the invention will be at once apparent or will become so from the detailed discussion of a preferred embodiment of the invention which follows. It will be understood in said description that the same is not to be taken in a limiting sense but merely as illustrative thereof and that many changes, alterations, modifications and/or rearrangement of parts will be suggested therefrom and are to be considered as coming within the spirit of the invention, the scope of the said invention being defined by the appended claims and which are to be construed as broadly as permitted by the prior art.

Now referring to the drawings:

FIGURE 3 is a fragmented partly sectioned view and illustrates the optical compartment assembled with the lamp housing and the camming arrangement for locking it in said relation with the lamp housing;

FIGURE 4 is a view taken along lines 4—4 of FIGURE 3 looking in the direction of the arrows to show further details of the locking arrangement;

FIGURE 5 is a vertical sectional view taken through the optical compartment to illustrate the arrangement of its component parts;

FIGURE 6 is a cross-section taken along lines 6—6 of FIGURE 5 to show details of the film gate;

FIGURE 7 is an enlarged sectional view, partially fragmented, taken through the film gate to illustrate the further details of the film gate and manner in which it is assembled with the condenser lens;

FIGURE 8 is a section taken along lines 8—8 of FIGURE 6;

FIGURE 9 is a front elevational view partially in section to show the film compartments assembled with the optical compartment, and the arrangement of the film reels and film feed controlling mechanism thereon;

FIGURE 10 is a side elevational view taken along lines 10—10 of FIGURE 9 to shown further details of the film compartment, its relation to the optical compartment and motor drive arrangement for turning the reels;

FIGURE 11 is a sectional view taken along lines 11—11 of FIGURE 9;

FIGURE 12 is a view taken along lines 12—12 of FIGURE 5 to illustrate the drive arrangement for obtaining axial adjustment of the objective lenses in the sharpening up of their focus for different magnifications or reductions to which the optical head is set with respect to the easel; and FIGURE 13 shows an alternative construction of forming the vacuum channel about the transparent film platen.

Figures 1, 2:
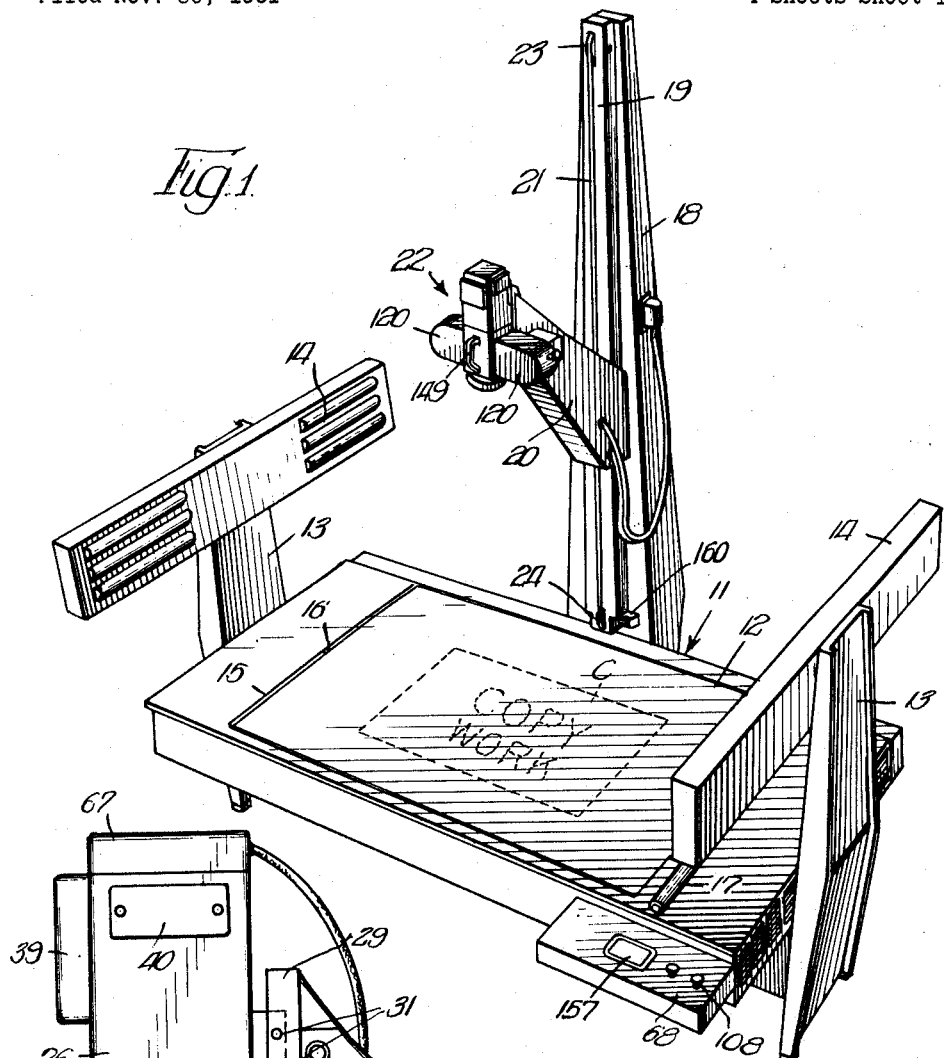
FIGURE 1 is a perspective view taken from the front righthand side of a photoreproduction device comprising a preferred embodiment of the invention.
FIGURE 2 is a fragmented view partly in section and showing the lamp housing mounted on the end of a supporting arm which is slidably mounted on an upright column.

Turning now more specifically to the several views which illustrate the invention and first to FIGURE 1, a combined camera-projector for micro-photography is there illustrated as comprising an easel 11 having a translucent top surface 12, the easel 11 being of rectangular box shape and preferably containing fluorescent bulbs or other equivalent light means by which copy work C positioned on the translucent top 12 may be back-lighted. Easel 11 is preferably supported by end-located uprights 13 which also support fluorescent bulbs indicated generally at 14 and which are provided with suitable reflectors to top light the copy work C. Preferably top plate 12 has a continuous channel 15 to encircle the copy C and which communicates through opens 16 to a suitable vacuum pump (not shown). At 17 is a roll of flexible acetate sheet material which may be unrolled over the copy work and the top plate 12 including the channel 15 so as to hold the copy work flat when the vacuum pump is operated to evacuate air from beneath the acetate sheet through channel 15. Associated with easel 11 and secured to the rear thereof is a vertical column 18 having a vertical guide way 19 along which one end of supporting arm 20 slides to position the combined camera-projector head 22 at a selected height over the copy work in accordance with a desired magnification or reduction of image size. Although any suitable means for raising and lowering the support 20 and optical head 22 may be utilized, in FIGURE 1 a chain 21 is shown passing over sprockets 23 and 24 and having its ends secured to the top and bottom sides of the support 20, the lower sprocket 24 forming part of a gear-reduction unit driven by an electric motor contained in the base of the column 18.

Optical head 22 comprises two separable parts; a lamp housing 26 which is permanently attached to the forward end of supporting arm 20 as hereinafter described, and an optical compartment 27 which is removably assembled beneath the lamp housing 26 and having film storage compartments 28 (FIGURE 9) fixed to either side thereof arranged and disposed as also hereinafter more fully described.

Referring now to FIGURE 2, between flanges 29 on the forward end of arm 20 is mounted a vertically extending plate 30, flanges 29 being secured to the opposed side edges of said plate 30 as by screws 31 or any other appropriate connecting means. Lamp housing 26 is connected to the upper end of said plate 30 as by screws 32, although again, any other appropriate connection means may be used. Lamp housing 26 is provided with an opening in its bottom wall defined by a depending circular shaped flange 33 which seats in the open top of the chamber in the optical compartment 27 for a purpose as will hereinafter be made clear. In the top of lamp housing 26 is provided a bracket 34 (FIGURE 10) supporting a socket 35 for a lamp 36. Bracket 34 is connected to a shelf-like portion 37 positioned to the forward side of the lamp housing 26, as by a threaded member 38. The opening in bracket 34 through which the stud portion of member 38 extends is purposely larger than the diameter of said stud in order to permit alignment of the filament of bulb 36 essentially on the axis of the flanged opening 33. Removable covers are provided on the lamp housing at 39 and 40 through which access may be gained to the interior of housing 26 for replacemet of the bulb and adjustment thereof to center its filament with respect to opening 33.

Turning now to FIGURE 5, optical compartment 27 comprises a unitary casting of aluminum or other machinable light metal having a cylindrically shaped chamber or bore therethrough which is precisely stepped to provide supporting ledges at 41, 42 and 43. Shelf 41 serves to receive the precisely dimensioned upper plate 44 which with plate 45 constitutes the film gate also as a first condenser lens 46 of plane convex shape to which the film gate members are cemented, the condenser lens having a flattened edge 47 paralleling its axis and which abuts a block 48 which is secured to the wall of housing 27 as by screws 49, said block having a complementary surface against which the flattened edge of lens 46 engages to resist its turning and precisely locating it. A spacer ring 51 rests on the edge of condenser lens 46, a portion thereof being cut out to provide clearance for block 48. Block 48 also serves to prevent turning of spacer 51. Spacer 51 serves as a seat for the peripheral edges of a second condenser lens having its convex side facing the convex side of the first lens 46. The assembly of upper plate 44 and condenser lens 46, spacer 51 and condenser 50 is fixed by means of retainer ring 52 which is threadedly connected with the appropriately threaded inner wall of chamber 40. Ring 52 is also internally threaded and has a portion 53 which forms a seat against which the lip of cap 54 engages when threadedly connected within ring 53 to bar the passage of light from lamp 36 as when the optical head is to be used as a camera. For its convenient manipulation and turning of the cap 54, means such as handle 55 is provided.

Below ledge 41, ledge 42 provides an appropriate peripherally disposed shoulder for supporting an iris shutter 56 of conventional construction. The optics of the system are completed by a pair of convexo-convex objective lenses 57, 58 cemented within an externally threaded sleeve 59 in proper axial spaced relation to each other. Sleeve 59 is threadedly mounted within an outer sleeve 60 which is supported in a fixed position on ledge 43 at the lower end of chamber 40 by means of its integral lip portion 61 and a retaining ring which is threaded to an externally threaded upper end of sleeve 60 so as to be firmly clamped about projecting ledge 43. Appropriate means, such as a set screw threaded through the wall of housing 27 to engage in sleeve 60 will also be provided to prevent rotation of sleeve 60 during the rotation of sleeve 59 therein. In the different spacings of the optical compartment relative to the easel to accommodate various magnifications or reductions of the image-projection, it is also important to sharpen the focus and maximize resolution by relocating the spacing of the objective lenses 58, 57 relative to the film. As seen in FIGURE 5, sleeve 59 is provided with a surrounding gear 63 whose teeth are adapted to mesh with a further gear 64 carried at the end of a vertical shaft 65, which extends upwardly through a provided opening in the casting which constitutes the optical compartment, and joins to the lower end of a shaft 66 which extends through the lamp housing and is rotated by appropriate operating mechanism 67 operated electrically from panel 68. This may be effected by a tongue and kerf arrangement as illustrated at 65A, 66A (FIG. 5). A counting device 69 is also operatively connected with said gear 63 through bevel gears 70A and 70B, the latter being mounted on a common shaft with gear 71 appropriately meshing with the teeth of gear 63. Counting device 69 thus provides a visible indication at 72 of the axial distance through which the objective lenses have been moved by rotation of shafts 65, 66 in response to means 67. This reading may be checked against a precalculated spacing of the objective lenses relative to the film which will assure maximum resolution and sharpness of converging and focus at the adjusted height of the optical chamber over the easel for a particular magnification or reduction factor. As will be hereinafter pointed out, this ability to accurately locate the objective lenses is particularly useful because of the precise location to which the film is set each time on the optical axis of the objective lenses.

Referring now to FIGURES 7 and 8, there is illustrated one form of platen and film gate assembly which provides for a precise location of the film which may be used as a reference in adjusting the objective lens for each magnification or reduction step or height of the film relative to the easel. The film platen 80 comprises a rectangular piece of clear transparent glass preferably of the same quality and optical characteristics as the condenser lens 46 and preferably has flat parallel opposed surfaces although the film contacting surface 81 thereof may be curved. It is preferably cemented to the plane side of the condenser lens 46 with adhesives such as are well known to those skilled in the art, or it may be fused thereto or formed as an integral part of the condenser lens in its initial grinding. As previously defined, the film gate comprises two frame members 44 and 45. Frame 44 is preferably formed to the same outer configuration as condenser lens 46 to which it is preferably also cemented. Frame 44 has a central opening to receive platen 80, the central opening being slightly larger than the width and length of platen 80. Frame 44 also has a thickness essentially the same as or only slightly greater than platen 80. It also has an inclined wall at 82 so as to provide a channel about platen 80 having a more restricted opening 83 about the periphery of the platen 80. Communicating with channel 82 is a bore 84 which communicates with the bore 85 of a depending block 86 through which a piece of tubing 87 (FIGURE 6) may be extended. Tubing 87 is appropriately connected by further tubing 88 into vertical bore 89 of the optical compartment which is connected to an air evacuating device not shown. To the underside of plate 44 is a second plate or frame 45 connected thereto as by screws 90. Said second frame 45 includes a continuous lip portion over restricted entrance 83 of channel 82 in spaced relation thereto. At their opposite ends plates 44 and 45 are appropriately shaped to form a film slot therethrough having communicating apertures at 92, the film being designed at F in FIGURE 7. Preferably the side walls of apertures 92 are flared outwardly in diverging relation and the end surfaces 94 of plate 45 are slightly beveled to provide ease in threading the film therethrough. As earlier mentioned, said portion 44 is shaped to the peripheral shape of condenser lens 96, and has a flattened portion at 93 corresponding to portion 47 of the condenser lens which also abuts block 48. Block 48 thus limits the position in which condenser lens 46 can be located and so properly aligns the film apertures 92 in the ends of frames 44, 45 with the openings 110 in the opposite sides of the optical compartment which provides access to the film gate for the film threading operation.

Shutter 56 is also provided with vacuum control operating mechanism connected through suitable tubing to a vertical port 95 in the optical compartment 27 which is also connected to the mentioned air-evacuating means. Desirably, the means operating the shutter and the drawing down of the film to conform to surface 81 of the platen may be controlled by a single button on the panel 68, a short delay being enforced between the initial application of the vacuum to the channel 82 before shutter 56 opens. This provides for the positive conforming of the film against the surface 81 of the platen before exposure. In any event, it will be understood that vacuumizing of channel 82 must be intermittent in the sense that it is essential to release the vacuum each time the film is to be advanced, and this may be arranged to occur automatically.

In FIGURE 13 frame 44 may be recessed as at 82A to form a continuous chamber about the platen 80 of which one wall is constituted by the plane surface of the condenser lens 46 and which chamber also communicates with a channel about platen 80 as indicated at 82B. This permits a vertical bore to be extended through the thickness of frame member 44 as at 85A with which bore 85 and block 86 connects. It will also be understood that, in either arrangement, plate 44 or 44A need not cover the entire area of the plane side of the condenser lens, although this has been found to be more practical.

Referring next to FIGURES 9 and 10, the rear side of optical compartment 27 is recessed at 96 to provide a seat for plate 97 which is permanently fixed by appropriate means to said rear side of the optical compartment. Said plate 97 has end portions projecting laterally to either side of the optical compartment and which constitute the aforementioned film compartments 28 on which are provided film reels 99 and operating mechanism associated therewith. As seen best in FIGURE 9, said plate 97 supports a pair of rotatable spindles 98, one on each side of the optical compartment and which are adapted to seat a film reel 99 so as to be turned therewith. Projecting rearwardly of plate 97 on each side of the optical compartment are housings 100, each containing an electric motor 101 whose shaft 102 operates through a suitable clutch 103 to the aforementioned reel supporting shaft 98. Clutches 103 are so adapted as to be engaged with shaft 102 only when its respective motor 101 is energized. This permits the film reels 99 to turn freely with their supporting shafts 98 when their respective driving motors are not energized.

Referring now to FIGURE 9 and considering the left-hand reel 99 as the film loaded reel, film F is led therefrom over roller 104, down around roller 105, is threaded through apertures 92 of the film gate between its frames 44, 44, over platen 80, and out its other aperture 92, then passed under roller 106, around roller 107, and onto the right-hand reel 99 considered as the take-up reel. The action of the film therefore running from left to right of FIGURE 9, right-hand motor 101 will be operated. This is accomplished by pressing an appropriate button 108 on panel 68. Button 108 is preferably of a type which immediately breaks the circuit when pressure thereon is released. Thus, by momentary pressing of button 108, motor 101 is energized sufficiently to advance the film one frame. When the device is to be used as a projector button 108 may be held down so as to continuously drive the motor 101 and thereby permit a continuous succession of images to be projected onto the surface 12 of the easel 11, as each frame of the film passes through the gate. A toggle switch 109 is provided on the underside of the right-hand motor housing 100 which when pushed in one direction permits energizing of the right-hand motor through actuation of button 108. When the toggle switch 109 is moved in the opposite direction, the left-hand motor will be energized by pressing button 108. In a center position, the toggle switch 109 will be set so that neither motor operates.

When utilized as a camera, it is essential that all light which can reach the film gate other than through the shutter 65 be occluded. The top of the compartment may be closed by insertion of cap 54 as previously mentioned. This will prevent the film gate from being back lighted by lamp 36. It will also act to prevent premature exposing of light-sensitive film in said gate as when the compartment is being transported to and from the dark room. The two sides of the optical compartment also have access openings 110 through which the film is led in threading into the film gate 44, 45. These openings as well as camera film on reels 99 also must be covered. For this purpose a pair of covers 120 are provided. Referring to FIGURES 9 and 11 the edge of supporting plate 97 is grooved as at 121 to provide a seat which receives the inturned lip 122 of the walls of the two housings 120. Preferably the two side walls of the optical compartment 27 are also grooved as at 123 and 124 to receive the top and bottom edges of the covers 120. Locking means are provided at either end of the compartment for holding the covers in place. Such means may comprise a thumb screw such as indicated at 125 having a shaft 126 threadedly connected in the wall of cover 120, to the end of which is secured latch 127. A receiving recess is provided in member 97 which receives latch 127 as the shaft 126 is threaded inwardly by turning member 125. By turning member 125 in the opposite direction, latch 126 is released from said recess to permit sliding of the cover outwardly of the aforementioned grooves 121, 123 and 124. Preferably, means are provided at 116 which work in conjunction with a microswitch 117 to meter the film as it passes over roller 126 so as to exactly center each frame of the film over platen 80. A second member 118 may also be provided in conjunction with a microswitch 119 to feel the film as it passes over roller 105 and to energize a signal when the roller 105 has been depleted of film.

One of the important features of the present invention is the arrangement wherein the lamp housing 26 is attached to supporting arm as a permanent part of the apparatus while the optical compartment and its associated film holding comparements are adapted to be removed from the lamp housing as a unit and to be subsequently assembled therewith quickly and conveniently. One advantage of such an arrangement is that the optical compartment with an exposed film may be separated from the apparatus and removed to the dark room for removal of the film and/or reloading. The optical compartment with the loaded film may be then reassembled with the lamp housing to continue the camera function. The ready separability of the optical compartment from the lamp housing also is necessary to permit the insertion or removal of cap 54 as in conversion of the apparatus from a camera to a projector, or reverse.

To accomplish ready assembly and disconnection of the optical compartment with the lamp housing, plate 30 which depends from the rear side of the lamp housing 26 serves first, as a guide against which the optical compartment may be positioned. It is also provided with a vertical keyway 131 of dovetail shape into which plate 130 seats. Plate 130 as seen in FIGURE 3 is connected by screws to the rear side of supporting plate 97 attached to the optical compartment 27 and has converging side edges 132 which complement the dovetail sides of recess 131. Secured to the lower end of plate 30 as by screws 133 is a cam-supporting plate 134 apertured at 135 to receive a depending projection 136 of cam member 137. Member 137 is also shouldered at 139 about projection member 136 to permit its relatively free movement over the top surface of supporting plate 134 as when rotated by operating arm 140 which is welded or otherwise formed integrally with washer member 141, the latter being connected to projection 136 as by a locking screw 142. As indicated in FIGURE 9, plate 130 has a catch portion 133 which projects through a provided opening in plate 30 so as to rest on the surface 145 of cam member 137. Opening 144 is made slightly larger than the vertical dimensions of catch 143 as vertical recess 131 is similarly made slightly longer in its vertical dimension than plate 130 to allow a limited vertical sliding movement of the optical compartment along plate 30 when its plate 130 is assembled in recess 131 and its catch portion is extended through opening 144 and over cam surface 145. This allows for convenient movement of the optical compartment upwardly toward the bottom wall of the lamp housing 26 to receive the depending flange portion 33 of the lamp housing 26 within the provided opening in ring 52 of the optical compartment to the position as seen in FIGURE 5, thus assuring alignment of its optical components with the filament of the lamp 36. This can be conveniently obtained by grasping the compartment 27, pushing the catch through opening 144 and sliding the compartment guided by plate 130 in recess 131. The compartment may be then locked in position by rotating arm 140 which effectively operates cam 145 to bring a higher portion thereof under said catch and thereby tightly wedge the top edge of the compartment against the underside of the lamp housing 26. By rotating the arm 140 in a reverse direction, the optical compartment will drop down out of its interfitting relation with flange 33, permitting catch 143 to be withdrawn through opening 140.

The operation of the apparatus will be reviewed, first when used as a camera to photograph copy positioned on the easel. A loaded reel of light-sensitive film is placed on the left-hand spindle 98 and the strand of film F guided over rollers 104 and 105 through aperture 110 into and out of the film gate, out the access aperture 110 in the other side of the compartment 27, then over and about rollers 106, 107 and wound on the right-hand reel 98. These operations preferably are handled in a dark room. The covers 120 are then positioned over the reels and locked in place as by means 125, and cap 145 is threaded into retainer ring 52.

At this point, the compartment 27 may be removed from the dark room and positioned beneath lamp housing 26 by locating flange 33 in the top opening of the compartment 27 and intermating the projection and kerf in the ends of shafts 65, 66, this being more easily accomplished after plate 130 has been located in keyway 131 of plate 30 and its catch 143 passed through opening 144. Compartment 27 is then locked in place by rotating arm 140 which causes cam surface 144 to force catch 143 upwardly, and thereby the compartment 27, against the underside of the lamp housing 26 to hold it immobile. Toggle switch 109 can be then actuated so that the right-hand motor will turn when energized from panel 68, the light-sensitive film in the camera operaton being considered to run left to right. The mounting of the optical compartment is not completed, however, until air hoses 150 and 151 are plugged into ports 153, 153 on the sides of the compartment 27 which communicate with vertical ports 87, 195. These provide for vacuumizing of the film gate channel 82 and operation of shutter 56, respectively. Electrical connector 154 must also be plugged into its co-operating socket 155 so as to permit operation of the reel motors.

Copy work is then placed on the easel surface 12, covered by the acetate 17 and vacuum applied to hold the copy flat. The optical head 22 can be then raised to the desired height for photographic reproduction of the copy work on the light-sensitive film in the film gate. Means 67 are also energized to rotate sleeve 59 so as to locate the objective lenses 57, 58 at a distance from the film which will sharpen the focus. The correctness of the spacing is read at 70. Preferably a counter 160 is also provided on column 18 operated by a gear on the shaft which turns with sprocket gear 24 to indicate the height of the optical head from the copy work. Readings may then be taken from both counters 70 and 160 and checked against a chart which will indicate the best spacing of the objective lenses 57, 58 relative to the indicated height of the optical head.

A reading also may be taken of dial 157 on panel 68 which is operated by the light meter 158 to indicate the light intensity on the copy work entering the optical system. The back as well as top lighting of the copy work may be then appropriately adjusted, if necessary. Button 108 is then pressed to air evacuate channel 82 to draw the film against platen surface 81 and also to momentarily open shutter 57 to expose the thus held film to light entering objective lenses 57, 58. The film is then advanced one frame and is again ready for photographing the same or a different piece of copy. When all of the frames of the film have thus been exposed, the optical compartment 27 is released from the lamp housing 26 by rotating arm 140 in its opposite direction, the air hoses 150, 151 and electrical conductor 154 being first unplugged. The compartment with the exposed film may be then carried to the dark room for unloading and reloading with further light-sensitive film.

However, if the apparatus is now to be operated as a projector, a film reel 99 loaded with developed film is inserted on the left-hand spindle 98 and the strand of developed film threaded over the rollers and through the film gate to the takeup reel, as before. However, this time it is not necessary to replace the covers 120. However, cap 45 must be removed from the ring 52 in order that when the optical compartment is mounted on the lamp housing, its condenser lenses 46, 50 will receive light from lamp 36. The compartment 27 is mounted as before with the air hoses 150, 151 and electrical conductor 154 plugged into place. Toggle switch 109 is again set to permit feeding of the film in the proper direction, the feed of the film through the film gate being sustained by holding down button 108. It is, of course, understood that, as before, the optical head 22 is initially located at a proper height from easel 12, now acting as a viewing screen, which accommodates a particular magnification. Means 67 are also energized to adjust the spacing of lenses 58, 59 to obtain the best focus of the film image on the easel for the particular magnification setting. The film may be driven in either direction, as previously indicated, and each frame of the film as it is centered in the film gate is held against platen surface 81 to validate the spacing of the objective lens which uses the vacuumized position of the film against the platen surface 81 as a reference.

From the above description of a preferred embodiment and its mode of operation, it will be apparent that all of the recited advantages, features, and objects of invention are obtained in a completely practical and efficient manner.

Therefore, having described my invention, I claim:

1. In a camera-projector comprising condenser lens means and objective lens means in spaced coaxial alignment, said condenser lens means including a plane surface on the side thereof toward the objective lens means, a film gate member comprising a platen of transparent glass cemented to said plane surface and a frame member about said platen having its inner edges in spaced relation to the peripheral edges of said platen and defining a continuous channel about said platen, the frame member including a guide portion by which film is guided across said platen and said frame member having conduit means for connecting said channel to air evacuating means whereby film covering said channel will be tightly drawn and conformed to the surface shape of the platen in response to actuation of the air evacuating means.

2. In combination with a condenser lens having a plane surface on one side thereof, a film gate member comprising a platen of transparent glass cemented to said plane surface of the condenser lens, a frame member spaced about the peripheral edges of said platen defining a continuous channel thereabout, said frame being apertured along two opposite sides which permit a film to be threaded therethrough and over the platen, covering said continuous channel, and said frame member having conduit means adapted for connecting said channel to air evacuating means whereby the film will be tightly drawn and conformed to the surface shape of the platen in response to actuation of the air evacuating means.

3. In combination, a condenser having a plane surface on one side thereof, a platen of transparent glass cemented to said plane surface, a first frame member about said platen, said frame member having its outer peripheral portion secured to said plane surface of the condenser lens in air tight relation therewith, and having its inner peripheral portion recessed on the side thereof toward the condenser lens defining with the peripheral edge of the platen and adjacent plane surface of the lens a continuous chamber about said platen, the inner peripheral edge of said frame member being spaced from the periphery of the platen to form a continuous channel thereabout communicating with said chamber, a second frame member secured to said first frame member and including a lip portion overlying said continuous channel and peripheral edge of the platen in spaced relation thereto, said two frame members constituting a film gate and being separated along two opposite sides to permit a film to be threaded therebetween and over the platen, said first frame member having an opening to said chamber and conduit means connected to said opening adapted for connection to air evacuating means whereby a film positioned between said frame members and over the platen will be tightly drawn and conformed to the surface shape of the platen in response to actuation of the air evacuating means.

4. The combination of a condenser lens having a plane surface, a platen of transparent material cemented to said plane surface, a frame cemented to said plane surface about said platen, said frame member having its inner edge spaced from the peripheral edges of said platen and defining a continuous channel thereabout, said frame member including means for guiding a film across said platen, and said frame member having conduit means for connecting said channel to air evacuating means.

5. In an optical system comprising condenser lens means and objective lens means in spaced coaxial alignment, a centrally disposed projection on the side of said condenser lens means toward the objective lens means, said projection forming a film receiving surface, a frame about said projection defining a continuous channel thereabout, said frame member including means for guiding a film across said film receiving surface of the projection, and conduit means for connecting said channel to air evacuating means whereby a film positioned over said projection and covering the channel will be tightly drawn and conformed to the surface shape of the projection in response to actuation of the air evacuating means.

6. The combination of claim 5 wherein the film receiving surface of the projection is curved.

7. The combination of claim 5 wherein the film receiving surface of the projection is planar.

8. In an optical image focusing device, an optical chamber comprising a one-piece metal casting having a cylindrical bore therethrough, one end of said bore being of reduced cross-section providing a peripherally disposed, inwardly extending ledge on which a mount for objective lenses is affixed, said chamber having a pair of oppositely disposed apertures in its sidewall through which film may be passed, said chamber having a pair of further peripherally disposed inwardly extending ledges, one on each side of said apertures, a shutter supported on the one of said two ledges nearest the ledge on which a mount for objective lens is affixed, a planoconvex condenser lens supporting a film gate on its plane side which is directed toward said objective lens mount and seating on the second of said two ledges, said film gate having film receiving apertures on two opposite ends, and means locating said condenser lens to align said apertures of the film gate in alignment with the oppositely disposed apertures in the sidewall of the optical chamber.

9. In an optical image focusing device, a one piece optical chamber having a cylindrical bore therethrough and a pair of oppositely disposed apertures in the sidewall thereof through which film may be passed, said bore having at least a pair of inwardly directed peripherally disposed ledges, one being located immediately above the apertures in the chamber sidewall, and a condenser lens supported on said one ledge and having a film gate mounted on its side toward said apertures of the chamber sidewall, said film gate having a pair of oppositely disposed film receiving apertures, and means locating said condenser lens to align said apertures of the film gate to be accessible from the apertures in the sidewall of the chamber.

10. In an optical image focusing device, an optical compartment having a cylindrical bore therethrough and a pair of oppositely disposed apertures in the sidewall of the chamber intermediate its ends, said bore having an inwardly directed, peripherally disposed ledge immediately to one side of said apertures, and a condenser lens having its peripheral portion supported on said ledge, a film gate carried by said condenser lens so as to be accessible through said openings in the chamber sidewall, said lens having a flattened edge parallel to its axis, and locating means in said bore adjacent said ledge against which said flattened edge engages to locate the condenser lens and align the film gate with the apertures in the sidewall of the chamber.

11. In an image focusing device, a film holder comprising a condenser lens having one side adapted as a transparent platen and a frame member mounted thereon about said platen having a film slot through which a film strand may be threaded over the platen, said film holder having a continuous channel about the platen which communicates with the film slot and is adapted for connection to air evacuating means.

References Cited by the Examiner
UNITED STATES PATENTS

| | | | |
|---|---|---|---|
| 1,478,828 | 12/23 | Jones | 95—76 |
| 1,675,492 | 7/28 | Huebner | 95—76 |
| 1,725,595 | 8/29 | Neill | 88—24 |
| 1,917,408 | 7/33 | Tuttle | 88—17 |
| 2,266,908 | 12/41 | Rogers | 88—24 |
| 2,317,348 | 4/43 | Wekeman | 95—76 X |
| 2,351,736 | 6/44 | Benford | 88—57 |
| 2,501,469 | 3/50 | Kouzminsky | 88—24 |
| 2,518,685 | 8/50 | Harrison | 88—24 |
| 2,584,401 | 2/52 | Thralls | 88—24 |
| 2,691,320 | 10/54 | Borberg | 88—17 |
| 2,826,957 | 3/58 | Klatt | 88—24 |
| 2,836,099 | 5/58 | Weishaupt | 88—24 |
| 2,895,706 | 7/59 | Blatherwick | 88—24 |
| 3,031,922 | 5/62 | Stadler | 88—24 |
| 3,104,585 | 9/63 | Wally | 95—76 X |

FOREIGN PATENTS 447,888  5/49  Italy.

LEO SMILOW, *Primary Examiner.*

EMIL G. ANDERSON, *Examiner.*